United States Patent [19]

Benefiel

[11] Patent Number: 5,100,732
[45] Date of Patent: Mar. 31, 1992

[54] COIL COATING ALUMINUM FOR USE AS AUTOMOTIVE VENEER

[75] Inventor: James W. Benefiel, Northville, Mich.

[73] Assignee: BASF Corporation, Southfield, Mich.

[21] Appl. No.: 288,325

[22] Filed: Dec. 22, 1988

[51] Int. Cl.⁵ .................... B32B 15/04; B32B 15/08
[52] U.S. Cl. ............................. 428/457; 72/46;
428/31; 428/202; 428/204; 428/209
[58] Field of Search .......... 428/31, 40, 457, 202,
428/204, 209; 156/285; 72/46; 113/116

[56] References Cited

U.S. PATENT DOCUMENTS

| | | | |
|---|---|---|---|
| 2,331,546 | 10/1943 | Gessler | 72/46 |
| 3,774,428 | 11/1973 | Derry | 72/46 |
| 4,678,690 | 7/1987 | Palmer et al. | 428/31 |
| 4,769,100 | 9/1988 | Short | 156/285 |
| 4,810,540 | 3/1989 | Ellison et al. | 428/31 |

*Primary Examiner*—Thomas J. Herbert, Jr.
*Attorney, Agent, or Firm*—Jerry F. Janssen; Rupert B. Hurley, Jr.; Cary W. Brooks

[57] ABSTRACT

A coated article comprises an outer, coated metal veneer coated with at least one coating selected from primer coatings, pigmented topcoat coatings, pigmented basecoat coatings and outer clear topcoat coating, the coated metal veneer affixed to an underlying substrate having substantially the same shape as the coated veneer.

The coated articles are particularly useful as body parts such as doors, hoods, trunk and roof panels, fenders, and rocker panels of automobile and truck bodies.

7 Claims, 3 Drawing Sheets

COIL COATING ALUMINUM FOR USE AS AUTOMOTIVE VENEER

TECHNICAL FIELD

The field of art to which this invention pertains is coil coated metal substrates, more specifically metal substrates coil coated with organic or inorganic surface coatings and in the form of automobile exterior body panels.

BACKGROUND OF THE INVENTION

In the automotive Original Equipment Manufacturer (O.E.M.) industry, it is an accepted, guiding principle that appearance and styling sells automobiles and vehicles. When purchasing a vehicle, appearance and styling are as important to the consumer as are other vehicle characteristics such as safety, performance and fuel economy.

One of the most important characteristics of an automobile's appearance and styling is the paint finish. Improvements in automotive paints and paint processes have resulted in O.E.M.s using almost exclusively "high-tech" glamour finishes such as basecoat/clear topcoat coatings which consist of a thin, pigmented, inner base coat and a thicker clear outer top coat. These "high-tech" finishes have improved depth, gloss, distinctness of image, chromaticity and durability.

The importance of the coating process for both appearance and corrosion protection is evidenced by the fact that approximately 40% to 50% of the cost of building an automobile is attributable to the cost of the coatings and the coating application process In addition the coating process takes up approximately 40% of the floor space in an O.E.M. assembly plant.

There is a need in the automotive industry to move the coating operation out of the OEM assembly plant. There are numerous reasons why it is not desirable to have a coating operation in an OEM plant. First of all, the present OEM coating operations are extremely inefficient. It is estimated that about 50% of the coatings are wasted as overspray during the coating process. Massive, costly environmental controls are necessary to capture the overspray. The cost of the wasted overspray paint and the costs attributable to the required environmental controls add considerably to the OEM's overhead.

Secondly, an OEM assembly plant is essentially a mechanical assembly operation, while the coating operations are in essence physico-chemical processes. The efficiency of the assembly process could be greatly enhanced by moving the coating process outside of the assembly plant.

Thirdly, it is known that dust and particles adversely affect coatings, both in appearance and integrity. Since the nature of an OEM assembly plant is mechanical assembly requiring an large open facility, it is difficult to control the environment us such a plant to completely eliminate dust and particles. There is a need to conduct coating operations in a controlled environment wherein the process takes place in a contained area with state-of-the-art heating, ventilating, air-conditioning, and filtration utilities, and environmental controls.

Environmental concerns as previously mentioned are yet another reason for moving the coating operation outside of the OEM assembly plant. The typical OEM coating and curing operations generate significant emissions of volatile organic compounds (VOC) into the environment, both within and outside of the OEM assembly plant. Along with the VOC emissions, significant quantities of waste are generated by the coating processes. This waste must be disposed of in strict compliance with all applicable federal, state and local environmental regulations at considerable cost.

Automobile manufacturers would prefer that automobile bodies painted are "off-site" and shipped to the assembly plant. While it is theoretically possible to coat the automobile bodies at the off-site manufacturing facility, this has not been possible due to the likelihood of damage to the finishes that would almost certainly occur during shipping.

In addition to the problems associated with in-plant coating operations, another problem facing OEM assembly plants is the coating of plastic bodies. There is a movement in the industry to convert from carbon steel to plastic bodied cars. Plastic parts are difficult to coat due to the inherent nature of plastics, which typically have difficult to adhere to surfaces. Plastics are also susceptible to attack and degradation from the solvents that are typically contained in automotive paints. Plastics are typically heat sensitive and require low temperature cure coatings. However, low temperature coatings do not always have optimal coating properties such as durability, gloss and solvent resistance. In addition, it is difficult to produce an automotive quality "glamour" finish on a plastic body part due to the inherent surface distortions and imperfections associated with molded body parts. In order to compensate for surface defects, primers and primer/surfaces must be used on plastic parts, not for corrosion protection, but to mask surface defects. In addition to plastic bodies, alternative substitute materials such as cellulosic materials and ceramic materials as well as other available materials are under consideration for use in automobile bodies.

There have been attempts to move a coating process out of assembly plants. U.S. Pat. No. 2,331,546 discloses a method of coating a flat steel plate with a flexible automotive coating. The coated plates are then die-formed into automobile body parts which can be directly assembled into an automobile body, purportedly without requiring any additional finishing treatment.

U.S. Pat. No. 3,774,428 discloses a method of precoating coiled aluminum metal and subjecting the metal to a die process to create a surface pattern. The resulting die-formed coated articles are used as siding for buildings.

U.S. Pat. No. 4,769,100 discloses a method of applying carrier films prepainted with metallic paint to automobile body panels. While such prepainted free films have the advantage of application over flexible substrates, they are subject to certain disadvantages. Such films tend to trap bubbles during application to the substrate; they also tend to "telegraph" imperfections in the surface of the substrate such as bumps, dimples, or reinforcing fiber patterns.

What is needed in this art is a method of coating automobile body parts which would eliminate the need for having a coating process in an OEM assembly plant. The coated parts would be assembled directly onto an automobile chassis. There is also a need in this art for a way of producing glamour coating finishes on body parts wherein the body parts comprise various materials other than metal.

DISCLOSURE OF THE INVENTION

A coated article is disclosed. The article comprises and outer coated metal veneer and an inner, underlying substrate. The outer metal veneer is preferably formed from coated, coiled metal. The veneer has an inner surface and an outer surface. At least one surface of the veneer is coated with at least one coating selected from the group consisting of inner primer coatings, pigmented basecoat coatings, clear topcoat coatings, and pigmented top coat coatings. The inner, underlying substrate has an inner surface and an outer surface and is formed from metal, solid or foamed plastic, fiber reinforced resinous material such as fiberglass, and the like. The substrate has a shape substantially conforming to the shape of the veneer. The inner surface of the veneer is affixed to the outer surface of the substrate to form the coated article.

Yet another aspect of the present invention is a method of manufacturing a coated article The method comprises cutting, forming, and affixing metal to a structural substrate which substantially conforms in shape to the formed metal. The metal is coated on at least one side with at least one coating selected from the group consisting of primer coatings, pigmented topcoat coatings, pigmented basecoat coatings, and clear outer topcoat coatings.

In one embodiment of the method of this invention, the metal is coated prior to the steps of cutting, forming, and affixing, preferably by coil coating. The coated metal is cut into pieces and the coated pieces are formed into coated veneers. The veneers have an outer surface and an inner surface. The coated veneer is then affixed to an underlying substrate, the substrate formed of metal, solid or foamed plastic, or fiber-reinforced resinous material which has a shape substantially conforming to or similar to the shape of the veneer. The substrate has an outer surface and an inner surface. The inner surface of the coated veneer is affixed to the outer surface of the substrate, thereby producing the coated article.

In another embodiment of the method of this invention, the metal is cut, formed into the desired shape, and affixed to the shape-conforming substrate prior to coating the metal with one or more coating layers. In this embodiment, conventional methods of applying the coating layers to the metal, such as spraying, are employed.

In yet another aspect of the present invention, automobile bodies comprise coated articles manufactured by the process of the present invention.

The foregoing, and other features and advantages of the present invention will become more apparent from the following description.

BEST MODE FOR CARRYING OUT THE INVENTION

Figure 1:
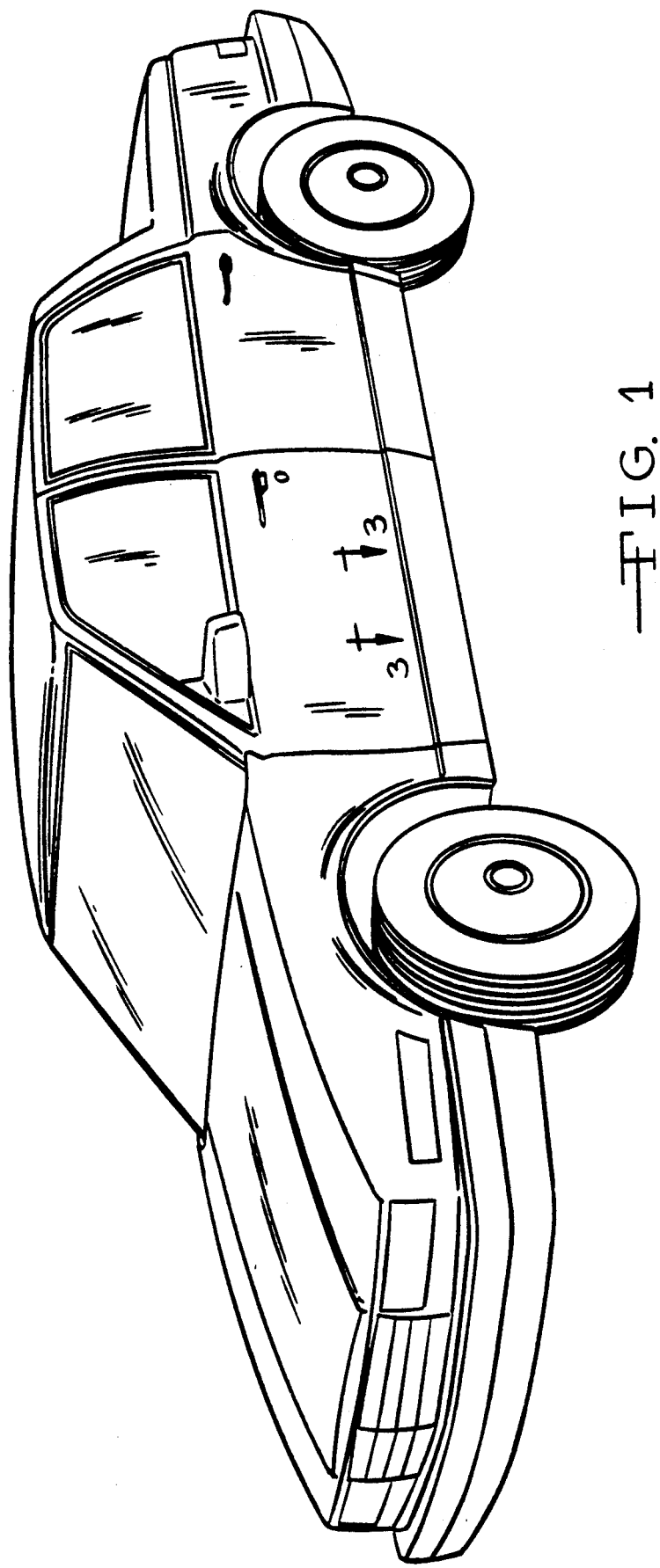
FIG. 1 shows an automobile fabricated, at least in part, of veneers of the present invention. Section 3—3, depicted in detail in FIG. 3, is a vertical section of the automobile door panel.

The coil coating process is well known in the coating arts. Coil coating can be defined as a continuous, automated process for applying coatings to coiled metal stock. Typically the process is initiated by simultaneously unwinding coiled metal and feeding the uncoiled metal stock to a coil coating means. A coil coating means typically consists of a plurality of rollers, feed mechanisms and coating means. As the metal stock from the coil is fed through the coil coating means it is cleaned and then coatings are applied and cured or dried at various stages. The coated metal stock is then rewound as it exits the coil coating means. In the coil coating process of the present invention, the coiled metal is fed into a coil coating means. The metal stock is initially cleaned at a cleaning section in the following manner. The coil is passed through a series of solvent baths or baths in combination with solvent vapor degreasers to remove mill oils and other surface contaminants. Solvent selection is determined by contaminants to be removed and metal being treated. Trichlorethylene, perchlorethylene and similar solvents are commonly used The moving coil is then pretreated with suitable surface protective chemicals. Zinc and/or iron phosphate treatments are typical for ferrous metals and crystalline and amorphous phosphate or amorphous chromate is used on aluminum substrate.

Next, the metal is dried in an oven at a sufficient temperature, typically about 140° C. The dried metal stock then moves to a primer coating application section. The primer coating is optionally applied to one or both sides of the metal stock to produce a coating having sufficient thickness, typically about 0.2 mil (0.0005 cm) to about 2.0 mils (0.005 cm). Next, the primer is moved curing oven where it is baked at a temperature sufficient to cure the primer, typically about 125° F. (52° C.) to about 1500° F. (815° C.). Then, after the primed coil exits the curing oven, it moves to a pigmented basecoat application section. A pigmented basecoat coating composition is applied to at least one side of the coil, preferably the top side by using a roller coating method commonly used in the coil coating industry whereby rollers are used to pick up paint from a reservoir and transfer it through a series of nearly contacting rollers to the metal coil stock from a final application roller. Alternatively, the coating may be applied by an air atomized spray. The coating is applied to a sufficient dry film thickness, typically about 0.1 mil (0.0003 cm) to about 2.5 mil (0.0064 cm). An optional bake stage to dry or flash the base coat might be used at this step. Then, once the base coat has been applied, the coil moves to the next section where a clear outer topcoat is applied over the basecoat. The outer topcoat is also applied through the use of transfer rollers to apply a clear overcoat to a sufficient dry film thickness or, alternatively, by spray methods known in the art.

The film thickness of the top coat is typically about 3.5 mils (0.009 cm) on a dry film basis. Once the clear topcoat has been applied, the coil moves to an oven section. The coil resides in the oven for a sufficient length of time at a sufficient temperature to cure the basecoat and clearcoat to a hard, but flexible, and durable coating. It will be appreciated by those skilled in the art that the topcoat can consist of a pigmented topcoat, a pigmented inner basecoat and clear outer topcoat, a clear topcoat, or multilayer coatings such as those disclosed in U.S. Pat. Nos. 4,753,829; 4,615,940; and 4,598,020 which are incorporated herein by reference.

Next, the coil stock moves to a coating station where a sufficient thickness of a protective coating is applied over the topcoat by roller transfer coating, doctor knife, curtain coater, dip coating, spray coating, or other means well known to those in the art. After drying or curing the protective coating to a protective, but removeable, outer coating, the coated metal is preferably rewound as it exits the coil coating means, and removed from the coil coating means. It is optional, however, to feed the coated metal stock to the next stage without coiling.

In the next stage of the process, the metal is unwound, and cut into pieces of sufficient size and shape to form a particular contoured veneer. The term "veneer" is defined to mean a contoured, coated metal article produced by the processes of the present invention. The cutting is accomplished by cutting apparatuses known in the art such as die cutting, laser cutting, saw cutting, and high pressure water cutting apparatuses or by other methods and apparatuses common to the metal fabrication industry.

After the coiled metal is cut into pieces, the pieces are inserted into die forming means and processed under sufficient pressure for a sufficient length of time and optionally at elevated temperature for enhanced flexibility of the coating system to produce a contoured veneer having an automotive grade exterior finish overcoated with a protective removable film. Examples of die-forming means include drawing, ironing, flexible dye forming such as the Verson-Wheelon process, Marform process, stretch forming, stretch-draw forming and other techniques known in the art.

The veneers can either be affixed to preformed, contoured automotive body parts or co-molded to a substrate, preferably plastic, to form coated metal veneer body parts.

Figure 4:
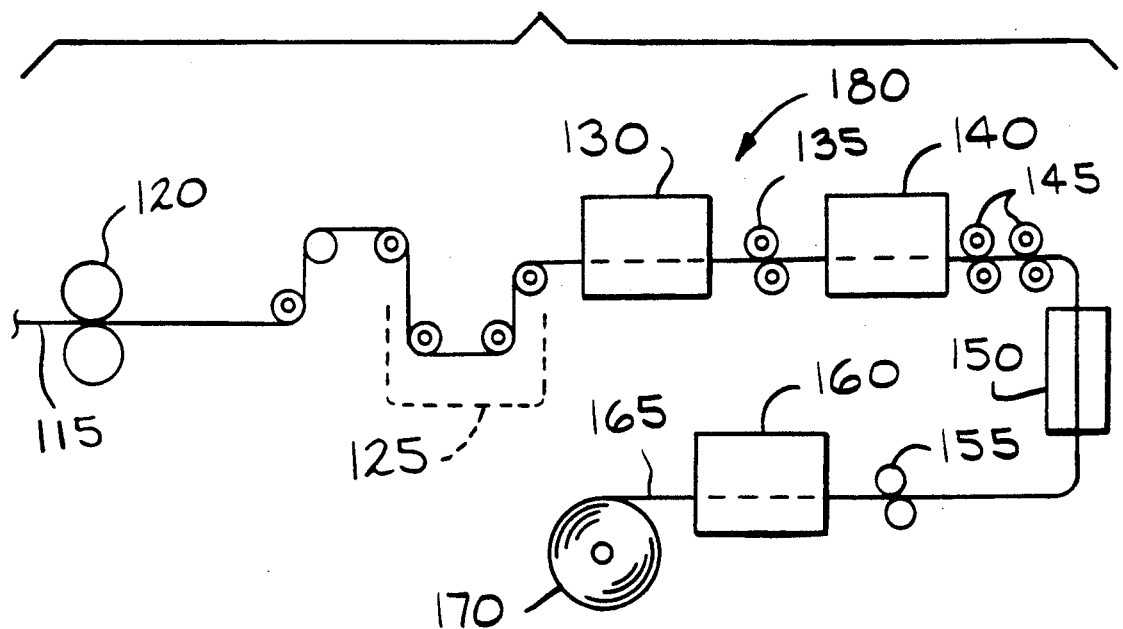
FIG. 4 shows a flow process for producing veneers of the present invention.
Figure 4:
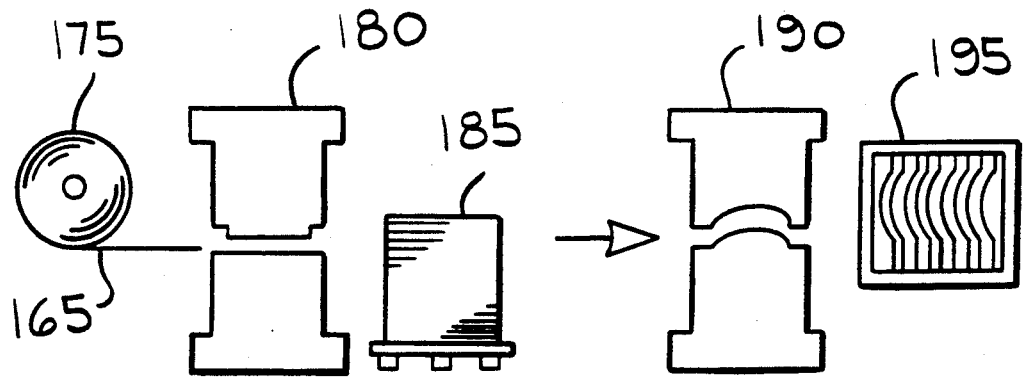

FIG. 4 is a flow diagram showing a typical process according to this invention. Referring to this diagram, the process is initiated by feeding a continuous band of metal coil 115 into coil coating means 180 via feed means 120. Coil stock 115 is pretreated in pretreatment means 125 with a conventional pretreatment such as a phosphating solution. Pretreated coil stock 115 then moves to primer application means 135 where a coating of primer is applied. The primed coil stock 115 is then moved to oven 140 where the primer coating is cured and/or dried. The primed coil stock 115 is then moved to coating means 145 where a topcoat coating is applied over the optional primer coating. The top coating preferably consists of a pigmented inner base coat coating and a clear outer topcoat coating applied over the pigmented base coat. The top coated coil stock 115 then is moved to oven 150 where the basecoat coating and the clear outer topcoat coating are cured. The top coated coil stock 115 is optionally moved to protective coating application means 155 where an optional, removable, protective coating is applied over top coated coil stock 115. Coil stock 115 is then moved to oven 160 where the protective coating is cured and/or dried to form coated coil stock 165. The coated coil stock 165 is then moved to coiling means 170 where it is rewound. Coated coil stock 165 is moved to uncoiling feed means 175.

In the next stages of the process, the uncoiled coated stock 165 is fed to cutting means 180 where it is cut into coated blanks 185. Coated blanks 185 are fed into die-forming means 190 where the blanks are formed into coated veneers 195. Coated veneers are then affixed to a structural substrate to form the final coated structure.

Figure 2:
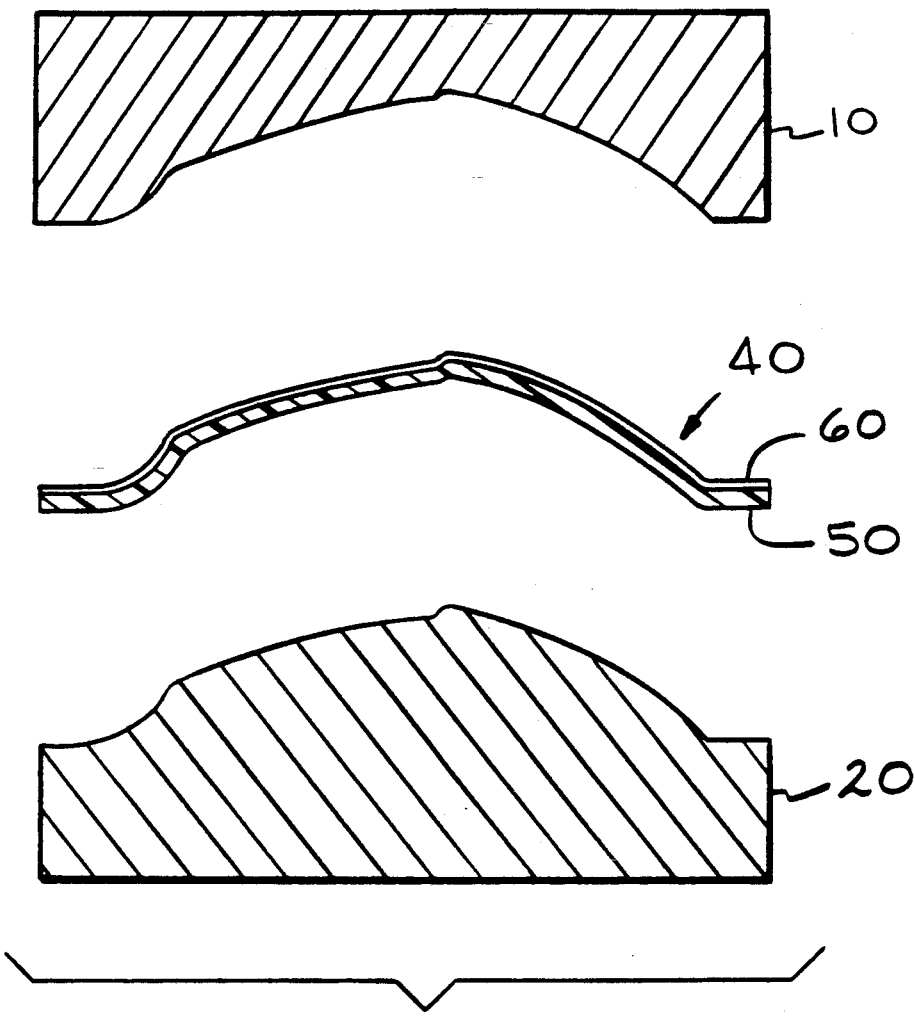
FIG. 2 shows a cross-section of one embodiment of the veneers of the present invention.

One embodiment of a veneer of the present invention, affixed to a structural substrate, is shown in FIG. 2. The structure 40 is shown between the male 10 and female 20 halves of a die-forming means. Structure 40 consists of an outer coated veneer 60 and an inner substrate 50. Inner substrate 50 is affixed to veneer 60 and conforms to the shape of veneer 60. A magnified section of structure 4o is illustrated in FIG. 3.

Figure 3:
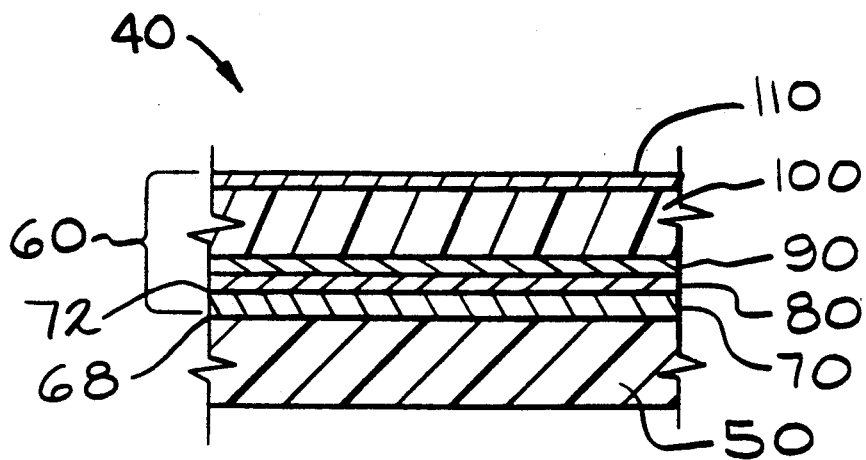
FIG. 3 is a detailed cross section of a veneer of the present invention.

Referring to FIG. 3, structure 40 is seen to comprise metal veneer 60 and underlying substrate 50 which is bonded to veneer 60. Veneer 60 consists of metal substrate 70 having top surface 72 and inner surface 68. Optional primer coating 80 is on top surface 72 of metal substrate 70. Pigmented base coat 90 covers primer coating 80. Clear topcoat 100 is on top of pigmented basecoat 90. Optional protective coating 110 is over clear coat coating 100.

Substrate 50 has substantially the same shape as veneer 60 and is affixed to inner surface 68 of metal veneer 60 to form coated structure 40.

Substrate 50 can be affixed to veneer 60 by several techniques including glueing, fastening, hot melt adhesives, Velcro ®, riveting, stapling and the like.

FIG. 1 illustrates a typical automobile body fabricated, at least in part, of veneer structures of the present invention. The veneers may comprise such parts of the automobile body as door, hood, and trunk panels, fenders, rocker panels, and the like. Section 3—3 through the door panel shows a detail of the veneer door panel which appears in detail in FIG. 3.

The veneer panel structures of this invention may be mounted to the body structure of the automobile by techniques well known in the art such as conventional adhesives, hot-melt adhesives, riveting, stapling, Velcro ®, nuts and bolts or other similar fastening means, and tongue-and-groove fastening means.

The primer coating compositions of the present invention will be based upon resinous film-forming polymer systems such as epoxies, polyesters, polyurethanes, acrylics, ureas and the like. The coating will contain sufficient amounts of cross-linking agents, pigments, and conventional additives. The cross-linking agent will include melamine, amines, ureas, carboxy, urethanes and the like.

The pigments will include those commonly used for the end application including titanium dioxide, phthalocyanines, quinacridones, iron oxides, carbon blacks and fillers such as clays, talcs, etc. The conventional additives will include acid catalysts such as sulfonic acids and salts thereof, silicone flow control additives and surface slip aids and various waxes for surface slip and mar resistance.

The film-forming basecoat coating compositions useful in the practice of the present invention will typically contain a resinous film-forming polymer, a pigment, a cross-linking agent and other additives typically included in coating compositions in this art. The film-forming polymer system includes epoxies, polyesters, polyurethanes, acrylics, fluoropolymers, and the like. The pigments will include titanium dioxide, phthalocyanines, lamp black, iron oxides, quinacridones, aluminum flake, micas, perylenes, imizadoles, and the like.

The cross-linking agents typically used will include melamines, amines, urethanes, carboxy resin, and the like. The additives will include acids and salts thereof, silicone flow controls, fumed silicas, and ultraviolet absorbers (e.g., Tinuvin 328 benzatriazole derivative).

The clear topcoat coating compositions will be similar to the basecoat coating compositions except that they will not contain pigment, although slight amounts of pigment could be added as long as the top coat remains transparent. Pigmented topcoat coating systems can be used instead of pigmented basecoat/clearcoat coating systems.

The removable protective coating compositions useful in the processes of the present invention will consist of acrylics, vinyls, urethanes, and the like. These compositions may be plasticized and would typically be thermoplastic in nature.

The protective coatings can be removed after application by simply peeling the protective coating off of the coated veneer. Alternatively, the coatings may be designed to be removed by dissolving in amine and water mixtures, for example.

The following examples are illustrative of the principles and practice of this invention, although not limited thereto. Parts and percentages where used are parts and percentages by weight.

EXAMPLES

EXAMPLE 1

Black basecoat components A and B were made in conventional mixing and milling equipment in accordance with the following formulations and procedures:

Component A—The following components were mixed and dispersed in a sand mill:

| Polyester polyol Resin (1) | 14.90 lb (6.75 kg) |
|---|---|
| Xylene | 4.97 lb (2.25 kg) |
| Carbon black (2) | 1.49 lb (0.68 kg) |

These components were mixed, after which the following were added:

| Polyester polyol resin (1) | 3.67 lb (1.66 kg) |
|---|---|
| Xylene | 0.99 lb (0.45 kg) |

The components were mixed and dispersed in a sand mill, after which an additional 26.92 lb (12.2 kg) of polyester polyol resin (1) were added. The resulting mixture was again mixed to form 52.3 lb (23.7 kg) of Component A.

Note (1): Polyester polyol is resin No. 410CD0214, manufactured by BASF Corporation, Coatings & Inks Division, Clifton, N.J.

Note (2): Carbon black (2) is "Block Pearls 1300," manufactured by Cabot Corp., Tuscola, Ill.

Component B—The following components were mixed in a typical mixing vessel:

| Polyisocyanate DESZ4370 (3) | 44.29 lb (20.1 kg) |
|---|---|
| Polyisocyanate DEXN75 (4) | 3.40 lb (1.54 kg) |

Note (3): Polyisocyanate DESZ4370 is manufactured by Mobay Corp., Hawthorne, NJ.
Note (4): Polyisocyanate DEXN75 is manufactured by Mobay Corp., Hawthorne, NJ.

EXAMPLE 2

Black basecoat components A and B from Example 1 above are mixed in a ratio of of 52.31 to 47.69, respectively, and fed to the paint feed supply of the roller coater of an aluminum coil coating applicator. Coil stock is suitably cleaned and pretreated with chromic surface treatment and fed to the coil coating line where the black two-component mixture is applied. The coated coil stock then passes to a baking zone for drying and curing. The coil then proceeds to a second coating roller system where the mixed A and B components are supplied (61.15 to 38.86 ratio) and again cured. One mil (0.003 cm) of dry film black basecoat and one and one-half mil (0.004 cm) of dry film clearcoat are applied. The vinyl temporary coating may then be applied and dried again by roller coating the coil. The coated aluminum coil is then cut and die stamped in the form of automotive body exterior skin components.

Automotive body skin components having necessary structural properties but lacking exterior final color finish coating are then given final desired surface appearance by affixing this precoated, formed aluminum veneer to these skin parts of essentially the same shape and dimensions. Excellent painted appearance results from this process.

EXAMPLE 3

White basecoat components A and B were made in conventional mixing and milling equipment in accordance with the following formulations and procedures:

| Component A | |
|---|---|
| TiO$_2$ paste | |
| Polyester polyol resin (1) | 12.67 lb (5.75 kg) |
| TiO$_2$ pigment (5) | 34.21 lb (15.5 kg) |
| Xylene | 7.50 lb (3.40 kg) |

The components are mixed and dispersed in a sand mill. The following components are then added to the sand milled mixture:

| Polyester polyol resin (1) | 10.12 lb (4.59 kg) |
|---|---|
| Tint paste (6) | Trace |
| Tint paste (7) | Trace |
| Tint paste (8) | Trace |
| Tint paste (2) | Trace |
| n-Butyl acetate | 11.26 lb (5.11 kg) |

The components are mixed to form 75.56 lb (25.4 kg) of component A.

Note (5) R-960, Du Pont Corp., Wilmongton, Del.
Note (6): Yellow oxide XLO-NP, Columbia Chemicals Co., Tulsa, Okla.
Note (7): Indanthrone A3R, Ciba-Geigy, Hawthorne, N.Y.
Note (8): Iron Oxide R-2899, Pfizer, New York, N.Y.

Component B

The following components were mixed in a typical mixing vessel.

| Polyisocyanate DESZ 4370 (3) | 22.51 lb (10.21 kg) |
|---|---|
| Polyisocyanate BRSN75 (9) | 1.73 lb (0.78 kg) |
| Total | 24.24 lb (10.99 kg) |

EXAMPLE 4

White basecoat is applied by electrostatic high speed rotational atomizing spray (turbobell) as a mixture of Parts A and B (formulated as described above in Example 3) in a ratio of 75.76 parts to 24.24 parts, respectively to a pretreated coil of aluminum stock.

The moving coil passes by the turobell applicator and passes through an oven for solvent dry off and cure. The white coating is 1.5 mils (0.004 cm). This white aluminum coil stock is die cut and stamped into a veneer in the form of an automotive engine compartment hood. A hood of conforming shape is formed and primed according to standard practice. An adhesive is then applied to the exterior surface of the primed, steel hood and the white aluminum veneer is affixed to the surface of the primed steel counterpart by means of this adhesive to form a veneer-coated hood. This structure exhibits a very uniform, smooth, defect free paint appearance to the hood which can then be installed on the automobile in the conventional manner.

EXAMPLE 3

The coated veneer of Example 2 is placed painted face down in the cavity half of a conventional heated compression molding apparatus designed to mold the automobile hood. A properly sized and shaped sheet molding compound (SMC) charge is loaded into the cavity on top of the veneer. The mold is closed and, under sufficient heat and pressure, the SMC flows to fill the mold and achieve intimate contact and physical and/or chemical bond with the treated aluminum surface of the skin. After 1 minute at 350° F. (177° C.), the mold is opened and the laminated part is ejected and allowed to cool. Secondary trimming, hole cutting, and hardware installation operations may now be performed as required by the design. At this point a fully-finished, automotive quality, laminated body part has been produced and is ready for mechanical assembly to the auto chassis in an OEM assembly plant. The part has an automotive quality coating.

I claim:

1. A coated article comprising a formed, shaped metal veneer having an inner surface and an outer surface, said veneer outer surface coated with at least one coating and, an underlying substrate having substantially the same shape as said veneer, and a means for securing said veneer inner surface to said substrate.

2. The article of claim 1 wherein the metal veneer comprises aluminum.

3. The article of claim 1 further comprising an adhesion-promoting coating on at least one surface of the veneer.

4. The article of claim 1 further comprising a removable, protective coating on at least one surface of the coated veneer.

5. The article of claim 1 wherein said substrate comprises a metal.

6. The article of claim 1 wherein said substrate comprises a plastic.

7. The article of claim 1 wherein said substrate comprises a fiber reinforced resinous material.

* * * * *